US007770619B2

(12) United States Patent
Miyoshi et al.

(10) Patent No.: US 7,770,619 B2
(45) Date of Patent: Aug. 10, 2010

(54) PNEUMATIC TIRE WITH TREAD HAVING LATERAL GROOVES AND SUB GROOVES

(75) Inventors: Masaaki Miyoshi, Hiratsuka (JP); Hiroshi Hata, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 12/323,768

(22) Filed: Nov. 26, 2008

(65) Prior Publication Data
US 2009/0151832 A1 Jun. 18, 2009

(30) Foreign Application Priority Data
Dec. 12, 2007 (JP) ............... 2007-321325

(51) Int. Cl.
*B60C 11/03* (2006.01)
*B60C 11/12* (2006.01)
(52) U.S. Cl. ............... 152/209.18; 152/209.27; 152/209.28; 152/DIG. 3; 152/903
(58) Field of Classification Search ............. 152/209.1, 152/209.18, 209.28, DIG. 3, 903, 209.27; D12/590, 591, 594, 595, 600, 601, 555, 556, D12/559, 564, 565
See application file for complete search history.

(56) References Cited

U.S. PATENT DOCUMENTS

| | | | | | |
|---|---|---|---|---|---|
| 4,574,856 | A | * | 3/1986 | Graas | 152/209.18 |
| 5,198,047 | A | * | 3/1993 | Graas et al. | 152/209.18 |
| 5,733,393 | A | * | 3/1998 | Hubbell et al. | 152/209.18 |
| 6,340,040 | B1 | * | 1/2002 | Ikeda | 152/209.18 |
| D472,517 | S | * | 4/2003 | Hutz et al. | D12/590 |
| 6,923,232 | B1 | * | 8/2005 | Welbes et al. | 152/209.18 |
| 7,143,798 | B2 | * | 12/2006 | Ratliff, Jr. | 152/209.18 |
| D559,771 | S | * | 1/2008 | Robert et al. | D12/556 |
| D584,221 | S | * | 1/2009 | Himuro | D12/584 |
| D587,189 | S | * | 2/2009 | Hata et al. | D12/591 |

(Continued)

FOREIGN PATENT DOCUMENTS

JP          07-290907        * 11/1995

(Continued)

OTHER PUBLICATIONS

Machine translation for Japan 07-290907 (no date).*

*Primary Examiner*—Steven D Maki
(74) *Attorney, Agent, or Firm*—Greer, Burns & Crain, Ltd.

(57) ABSTRACT

Provided is a pneumatic tire in which left- and right-side lateral grooves extend between first main grooves and second main grooves, and in which left- and right-side sub grooves extend halfway from the second main grooves toward the first main grooves. The lateral grooves and the sub grooves are disposed alternately with each other at predetermined pitches in tire circumferential directions. The left- and right-side lateral grooves respectively include: first groove portions extending from the first main grooves; and second groove portions extending from the second main grooves while curving inwardly toward tire width directions. The left- and right-side lateral grooves are offset from each other in the tire circumferential directions. Opening portions at both ends of each of the lateral grooves, which are opened to the first main grooves and the second main grooves, are shifted from one another in the tire circumferential directions.

10 Claims, 3 Drawing Sheets

| | U.S. PATENT DOCUMENTS | | | | JP | A 11-208213 | 8/1999 |
|---|---|---|---|---|---|---|---|
| | | | | | JP | 11-334317 | * 12/1999 |
| 2003/0094226 A1* | 5/2003 | Colombo et al. | ....... | 152/209.18 | JP | A 2000-135904 | 5/2000 |
| 2007/0017618 A1* | 1/2007 | Miyasaka et al. | ...... | 152/209.18 | JP | A 2004-148855 | 5/2004 |
| 2007/0051448 A1* | 3/2007 | Yumii | ................... | 152/209.18 | JP | WO 2004/103737 A1 | 12/2004 |
| | | | | | JP | A 2007-55333 | 3/2007 |
| | FOREIGN PATENT DOCUMENTS | | | | JP | A 2008-37139 | 2/2008 |
| JP | A 11-115416 | 4/1999 | | | * cited by examiner | | |

PRIOR ART

Fig. 5

PNEUMATIC TIRE WITH TREAD HAVING LATERAL GROOVES AND SUB GROOVES

BACKGROUND OF THE INVENTION

1. Field of the Invention

The present invention relates to a pneumatic tire. More specifically, the present invention relates to a pneumatic tire that improves driving stability and noise performance and simultaneously maintains wet performance.

2. Description of the Related Art

In a conventional pneumatic tire, main grooves extending in a tire circumferential direction and lateral grooves extending in a tire width direction have been modified in shape and arrangement in order to achieve a good balance between the driving stability and drainage (for example, see Japanese patent application Kokai publication No. 2004-148855) However, in recent years, along with improvements in the vehicle performance, further improvements in the tire performance such as driving stability, wet performance, and also noise performance are desired. These improvements have been strongly sought to be achieved.

SUMMARY OF THE INVENTION

An object of the present invention is to provide a pneumatic tire capable of improving driving stability and noise performance while maintaining wet performance.

An aspect of the present invention that accomplishes the above object provides a pneumatic tire characterized as follows. The pneumatic tire includes: single first main grooves extending in tire circumferential directions and disposed respectively on right and left sides of a tire equator of a tread surface; and single second main grooves extending in the tire circumferential directions and disposed respectively on outer sides, in tire width directions, of the first main grooves. Lateral grooves extending between each pair of the first main grooves and the second main grooves as well as sub grooves extending halfway from the second main grooves toward the respective first main grooves are disposed alternately with each other at predetermined pitches in the tire circumferential directions. Blocks are formed each of which is defined by the first main groove, the second main groove and the lateral groove. Each of the left-side lateral grooves positioned on the left side of the tire equator on the tread surface region has: a first groove portion LG1 extending from the first main groove in one direction of the tire circumferential directions; and a second groove portion LG2 extending from the second main groove inwardly in the tire width direction while curving toward the one direction of the tire circumferential directions, and being connected to one side edge portion of the first groove portion LG1. The first groove portion LG1 has: an inclined groove portion LG1a extending from the first main groove outwardly in the tire width direction while inclined toward the one direction of the tire circumferential directions; and a circumferential-direction groove portion LG1b extending, in the one direction of the tire circumferential directions, from the inclined groove portion LG1a up to a position where the circumferential-direction groove portion LG1b overlaps the adjacent sub groove when seen from a tire side surface. The left-side sub grooves extend from the second main groove inwardly in the tire width direction while curving toward the one direction of the tire circumferential directions, and are set apart from the first groove portions LG1. The left-side sub grooves and the second groove portions LG2 are disposed alternately with each other in the tire circumferential directions. Each of the right-side lateral grooves positioned on the right side of the tire equator on the tread surface region has: a first groove portion RG1 extending from the first main groove in the other direction of the tire circumferential directions; and a second groove portion RG2 extending from the second main groove inwardly in the tire width direction while curving toward the other direction of the tire circumferential directions, and being connected to an opposite side edge portion of the first groove portion RG1. The first groove portion RG1 has: an inclined groove portion RG1a extending from the first main groove outwardly in the tire width direction while inclined toward the other direction of the tire circumferential directions; and a circumferential-direction groove portion RG1b extending, in the other direction of the tire circumferential directions, from the inclined groove portion RG1a up to a position where the circumferential-direction groove portion RG1b overlaps the adjacent sub groove when seen from a tire side surface. The right-side sub grooves extend from the second main groove inwardly in the tire width direction while curving toward the other direction of the tire circumferential directions, and are set apart from the first groove portions RG1. The right-side sub grooves and the second groove portions RG2 are disposed alternately with each other in the tire circumferential directions. Apertures at both ends of each of the lateral grooves are opened to the first main grooves and the second main grooves, respectively, and are shifted from one another in the tire circumferential directions. The left- and right-side lateral grooves are offset from each other in the tire circumferential directions. The apertures of both the left- and right-side lateral grooves are shifted from one another in the tire circumferential directions.

Another aspect of the present invention provides a pneumatic tire characterized as follows. The pneumatic tire includes: a single first main groove extending in tire circumferential directions and disposed on a tire equator of a tread surface; and single second main grooves extending in the tire circumferential directions and disposed respectively on both sides, in tire width directions, of the first main groove. Lateral grooves extending between the first main groove and the respective second main grooves as well as sub grooves extending halfway from the second main grooves toward the first main groove are disposed alternately with each other at predetermined pitches in the tire circumferential directions. Blocks are formed each of which is defined by the first main groove, the second main groove and the lateral groove. Each of the left-side lateral grooves positioned on the left side of the tire equator on the tread surface region has: a first groove portion LG1 extending from the first main groove in one direction of the tire circumferential directions; and a second groove portion LG2 extending from the second main groove inwardly in the tire width direction while curving toward the one direction of the tire circumferential directions, and being connected to one side edge portion of the first groove portion LG1. The first groove portion LG1 has: an inclined groove portion LG1a extending from the first main groove outwardly in the tire width direction while inclined toward the one direction of the tire circumferential directions; and a circumferential-direction groove portion LG1b extending, in the one direction of the tire circumferential directions, from the inclined groove portion LG1a up to a position where the circumferential-direction groove portion LG1b overlaps the adjacent sub groove when seen from a tire side surface. The left-side sub grooves extend from the second main groove inwardly in the tire width direction while curving toward the one direction of the tire circumferential directions, and are set apart from the first groove portions LG1. The left-side sub grooves and the second groove portions LG2 are disposed alternately with each other in the tire circumferential directions. Each of the right-side lateral grooves positioned on the right side of the tire equator has on the tread surface region: a first groove portion RG1 extending from the first main groove in the other direction of the tire circumferential directions; and a second groove portion RG2 extending from the second main groove inwardly in the tire width direction while curving toward the other direction of the tire circumferential directions, and being connected to an opposite side edge portion of the first groove portion RG1. The first groove portion RG1 has: an inclined groove portion RG1a extending from the first main groove outwardly in the tire width direction while inclined toward the other direction of the tire circumferential directions; and a circumferential-direction groove portion RG1b extending, in the other direction of the tire circumferential directions, from the inclined groove portion RG1a up to a position where the circumferential-direction groove portion RG1b overlaps the adjacent sub groove when seen from a tire side surface. The right-side sub grooves extend from the second main groove inwardly in the tire width direction while curving toward the other direction of the tire circumferential directions, and are set apart from the first groove portions RG1. The right-side sub grooves and the second groove portions RG2 are disposed alternately with each other in the tire circumferential directions. Apertures at both ends of each of the lateral grooves are opened to the first main groove and the second main grooves, respectively, and are shifted from one another in the tire circumferential directions. The left- and right-side lateral grooves are offset from each other in the tire circumferential directions. The apertures of both the left- and right-side lateral grooves are shifted from one another in the tire circumferential directions.

According to the present invention described above, a block portion, in the tire circumferential directions, defined by the first main groove and the first groove portion of the lateral groove has a significantly longer length than a block portion, in the tire circumferential directions, defined by the sub groove and the second groove portion of the lateral groove. Thereby, it is possible to significantly enhance the rigidity, in the circumferential directions, of the block portion defined by the first main groove and the first groove portion. Thus, the driving stability can be improved.

Moreover, the lateral groove and the sub groove are curved from the tire width directions. Edge portions of the block, which are adjacent to the lateral groove and the sub groove, respectively, are made not to be aligned with the tire width directions. Thereby, it is possible to reduce a noise caused by hitting a road by the edge portions of the block adjacent to the lateral groove and the sub groove. In addition, the apertures at both ends of each of the lateral grooves which are opened to the first main groove and the second main groove are shifted from one another in the tire circumferential directions. No aperture is aligned with the other apertures in the tire width directions. This enables noise frequencies to be distributed. Thus, the noise performance can be improved.

The tread surface defines a tire-contact patch. Each of the left-side sub grooves and the right-side sub grooves remain open in the tire-contact patch and each of the curving groove portions LG2, RG2, inclined groove portions LG1a, RG1a and circumferential direction groove portions LG1b, RG1b remain open in the tire-contact patch. Furthermore, the circumferential-direction groove portion of the lateral groove is extended up to the position where the circumferential-direction groove portions are overlap the adjacent sub groove when seen from the tire side surface. The length of the circumferential-direction groove portion is made sufficiently long. Thereby, it is made possible to effectively channel water into the nearby circumferential-direction groove portion, and to discharge the water from the second groove portion and the inclined groove portion into the main grooves. Thus, the wet performance can be maintained.

DESCRIPTION OF THE PREFERRED EMBODIMENTS

Hereinafter, embodiments of the present invention will be described in detail with reference to the accompanying drawing.

Figure 1:
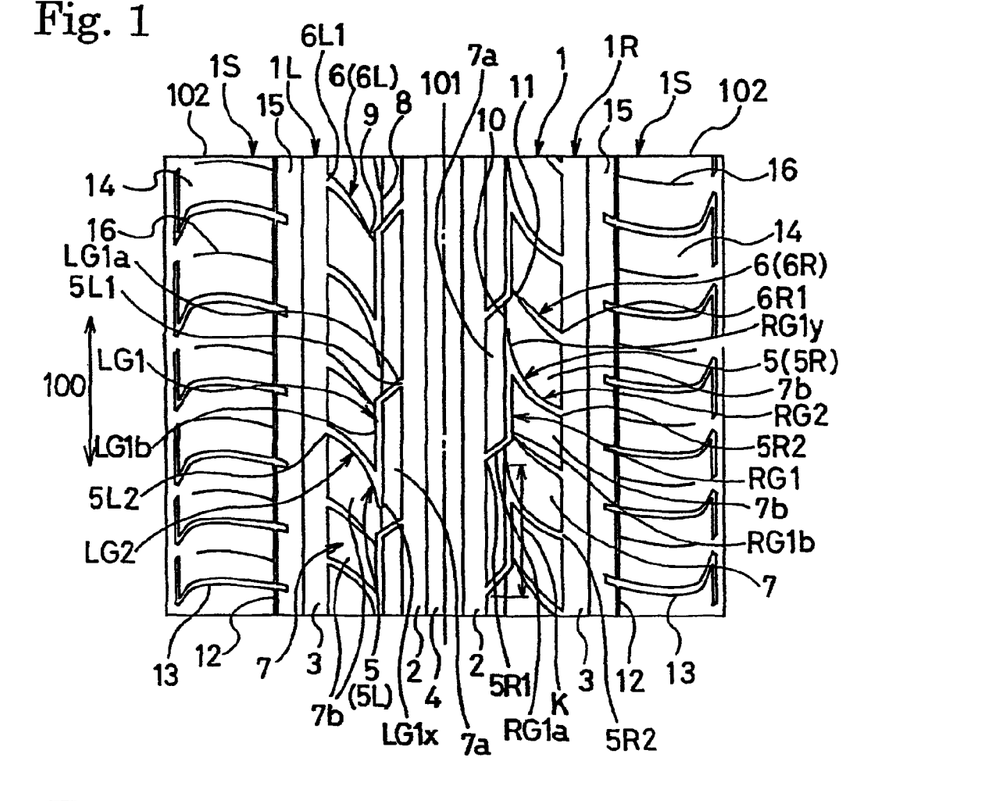
FIG. 1 is a developed view of a principal part of a tread surface for illustrating one embodiment of a pneumatic tire according to the present invention.

FIG. 1 illustrates one embodiment of a pneumatic tire according to the present invention. Reference numeral 1 denotes a tread surface. Four main grooves are formed in the tread surface 1, and extend straightly in tire circumferential directions 100. The four main grooves are constituted of: two first main grooves 2; and two second main grooves 3. The first main grooves 2 are disposed on right and left sides of a tire equator 101. The second main grooves 3 are disposed on both outer sides, in tire width directions, of the two first main grooves 2. Shoulder regions 1S are formed on the tread surface 1 on both outer sides, in the tire width directions, of the second main grooves 3. Note that, herein, the main grooves 2, 3 each have a width of 6 mm to 18 mm and a depth of 6 mm to 10 mm.

Between the first main grooves 2, a rib 4 is formed, which continuously extends in the tire circumferential directions 100. Lateral grooves 5 and sub grooves 6 are alternately disposed at predetermined pitches in the tire circumferential directions 100. The lateral grooves 5 extend between pairs of the first main groove 2 and the second main groove 3. The sub grooves 6 extend halfway from the second main grooves 3 toward the corresponding first main groove 2. Between the first main groove 2 and the second main groove 3, multiple blocks 7 are formed, each defined by the first main groove 2, the second main groove 3 and the lateral groove 5.

Left-side lateral grooves 5L are positioned on a tread surface region 1L on the left side of the tire equator 101. The lateral groove 5L is formed of: a first groove portion LG1; and a second groove portion LG2. The first groove portion LG1 extends from the left-side first main groove 2 in one direction (downward in FIG. 1) of the tire circumferential directions 100. The second groove portion LG2 extends from the left-side second main groove 3 inwardly in the tire width direction while curving toward the one direction of the tire circumferential directions 100.

The first groove portion LG1 is formed of: an inclined groove portion LG1a; and a circumferential-direction groove portion LG1b. The inclined groove portion LG1a extends from the first main groove 2 straightly and outwardly in the tire width direction while inclined toward the one direction of the tire circumferential directions 100. The circumferential-direction groove portion LG1b in parallel to the tire circumferential directions 100 extends straightly from the inclined groove portion LG1*a* in the one direction of the tire circumferential directions 100. The circumferential-direction groove portion LG1*b* extends up to a position where the groove portion LG1*b* overlaps an adjacent sub groove 6L when seen from a tire side surface. The sub groove 6L is positioned in the tread surface region 1L on the left side of the tire equator 101.

Figure 2:
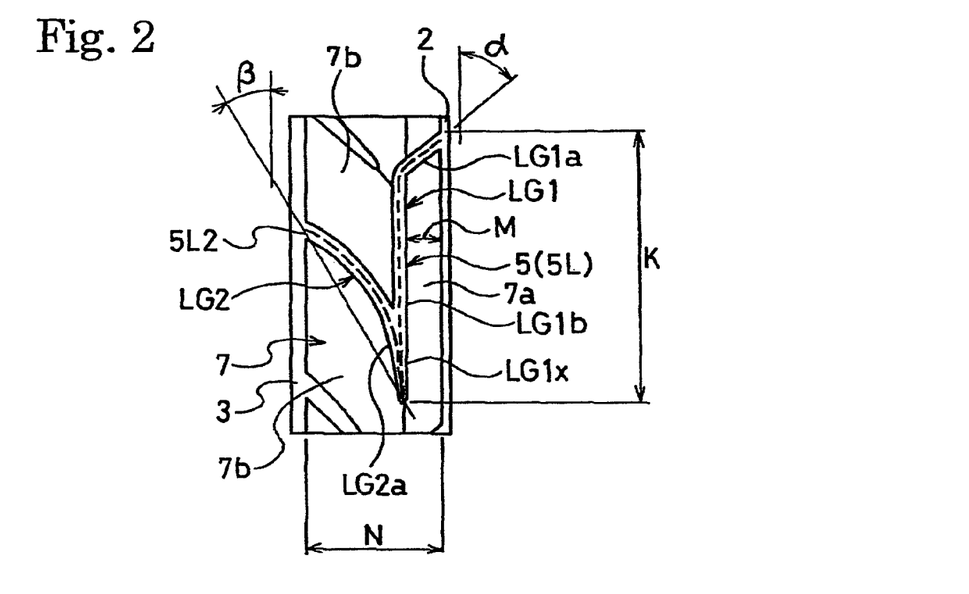
FIG. 2 is a partially enlarged view of FIG. 1.

The second groove portion LG2 extends from the second main groove 3 so as to form a curve (arc) that has convex form in the other direction of the tire circumferential directions 100 (upward in the drawing). The second groove portion LG2 is connected to one side edge portion LG1*x* of the first groove portion LG1 (circumferential-direction groove portion LG1*b*). As shown in FIG. 2, an aperture. LG2*a* of the second groove portion LG2 is opened to the one side edge portion LG1*x* of the circumferential-direction groove portion LG1*b*. The aperture LG2*a* is significantly larger than an aperture 5L2 that is opened to the second main groove 3. Instead of extending in such a curved form, the second groove portion LG2 may extend in a straight form, or may be formed in combination of the curved and straight forms.

The sub groove 6L positioned on the left side of the left-side tread surface region 1L extends from the second main groove 3 inwardly in the tire width direction while curving toward the one direction of the tire circumferential directions 100. The sub groove 6L does not communicate with, and thus is set apart from, the first groove portion LG1. The sub grooves 6L are formed in a manner alternating with the second groove portions LG2 in the tire circumferential directions 100.

Both an aperture 5L1 and the aperture 5L2 of the lateral groove 5L are opened respectively to the first main groove 2 and the second main groove 3, and are shifted from each other in the tire circumferential directions 100 so as not to be aligned with each other in the tire width directions. Furthermore, an aperture 6L1 of the sub groove 6L is opened to the second main groove 3, and is also shifted from both the apertures 5L1, 5L2 of the lateral groove 5L in the tire circumferential directions 100.

One sipe 8 is formed from the one side edge portion LG1*x* of the circumferential-direction groove portion LG1*b* to the inclined groove portion LG1*a* of the adjacent lateral groove 5L. The sipe 8 extends straightly in the tire circumferential directions 100. Moreover, one extending sipe 9 is formed from an inner-side edge of the sub groove 6 to the circumferential-direction groove portion LG1*b* of the adjacent lateral groove 5L. Note that the sipes 8, 9 described hereinbefore and sipes 10, 11 to be described hereinafter are notches each having a width of 0.5 mm to 1.0 mm and a depth of 2 mm to 6 mm. The depths of these sipes are shallower than those of the lateral groove 5 and the sub groove 6.

Right-side lateral grooves 5R are positioned on a tread surface region 1R on the right side of the tire equator 101. The lateral groove 5R is formed of: a first groove portion RG1; and a second groove portion RG2. The first groove portion RG1 extends from the right-side first main groove 2 in the other direction of the tire circumferential directions 100. The second groove portion RG2 extends from the right-side second main groove 3 inwardly in the tire width direction while curving toward the other direction of the tire circumferential directions 100.

The first groove portion RG1 is formed of: an inclined groove portion RG1*a*; and a circumferential-direction groove portion RG1*b*. The inclined groove portion RG1*a* extends from the first main groove 2 straightly and outwardly in the tire width direction while inclined toward the other direction of the tire circumferential directions 100. The circumferential-direction groove portion RG1*b* in parallel to the tire circumferential directions 100 extends straightly from the inclined groove portion RG1*a* in the other direction of the tire circumferential directions 100. The circumferential-direction groove portion RG1*b* extends up to a position where the groove portion RG1*b* overlaps an adjacent sub groove 6R when seen from a tire side surface. The sub groove 6R is positioned in the tread surface region 1R on the right side of the tire equator 101.

The second groove portion RG2 extends from the second main groove so as to form a curve (arc) that has convex form in the one direction of the tire circumferential directions 100. The second groove portion RG2 is connected to an opposite side edge portion RG1*y* of the first groove portion RG1 (circumferential-direction groove portion RG1*b*). An aperture of the second groove portion RG2 is opened to the opposite side edge portion RG1*y* of the circumferential-direction groove portion RG1*b*. The aperture is significantly larger than an aperture 5R2 that is opened to the second main groove 3. Instead of extending in such a curved form, the second groove portion RG2 may extend in a straight form, or may be formed in combination of the curved and straight forms.

The sub groove 6R positioned on the right side of the right-side tread surface region 1R extends from the second main groove 3 inwardly in the tire width direction while curving toward the other direction of the tire circumferential directions 100. The sub groove 6R does not communicate with, and thus is set apart from, the first groove portion RG1. The sub grooves 6R are formed in a manner alternating with the second groove portions RG2 in the tire circumferential directions 100.

Both an aperture 5R1 and the aperture 5R2 of the lateral groove 5R are opened respectively to the first main groove 2 and the second main groove 3, and are also shifted from each other in the tire circumferential directions 100 so as not to be aligned with each other in the tire width directions. Furthermore, the left- and right-side lateral grooves 5L, 5R are offset from each other in the tire circumferential directions 100. Thereby, the apertures 5L1, 5L2, 5R1 and 5R2 of both the left- and right-side lateral grooves 5L, 5R are also shifted from one another in the tire circumferential directions 100. Moreover, an aperture 6R1 of the sub groove 6R is opened to the second main groove 3, and is also shifted from the apertures 5L1, 5L2, 5R1 and 5R2 of both the lateral grooves 5L, 5R as well as the aperture 6L1 of the sub groove 6L in the tire circumferential directions 100. Accordingly, no aperture is aligned with the other apertures in the tire width directions.

One sipe 10 is formed from the opposite side edge portion RG1*y* of the circumferential-direction groove portion RG1*b* to the inclined groove portion RG1*a* of the adjacent lateral groove 5R. The sipe 10 extends straightly in the tire circumferential directions 100. Moreover, one extending sipe 11 is formed from an inner-side edge of the sub groove 6 to the circumferential-direction groove portion RG1*b* of the adjacent lateral groove 5R.

In each shoulder region 1S on the tread surface 1, one circumferential-direction narrow groove 12 is formed closer to the second main groove 3. The circumferential-direction narrow groove 12 has a narrower groove width than the main grooves 2, 3 that extend straightly along the tire circumferential directions 100. Lateral grooves 13 extending in the tire width directions are disposed at predetermined pitches in the tire circumferential directions 100. Each lateral groove 13 is made to extend outwardly in the tire width direction from a position apart from the second main groove 3 across the circumferential-direction narrow groove 12 and beyond a tire-contact patch edge 102. Note that the circumferential-direction narrow groove 12 described herein is a groove having a width of 1 mm to 3 mm and a depth of 4 mm to 6 mm.

In each shoulder region 1S, multiple blocks 14 defined by the circumferential-direction narrow groove 12 and the lateral grooves 13, as well as one rib 15 defined by the second main groove 3 and the circumferential-direction narrow groove 12 are formed. In each block 14, one sipe 16 is formed, extending from the circumferential-direction narrow groove 12 beyond the tire-contact patch edge 102 outward in the tire width directions.

In the present invention described above, a portion 7a of the block 7, which is defined by the first main groove 2 and first groove portion LG1 or RG1, is allowed to have a significantly longer (double in the illustrated example) length in the tire circumferential directions than a portion 7b of the block 7 defined by the sub groove 6 and the second groove portion LG2 or RG1. Thereby, it is possible to significantly enhance the rigidity, in the circumferential directions, of the block portion 7a. Thus, the driving stability can be improved.

Moreover, in the present invention, the lateral groove 5 and the sub groove 6 are curved in respect to the tire width directions. Edge portions of the block 7, which are adjacent to the lateral groove 5 and the sub groove 6, respectively, are made not to be aligned with the tire width directions. Thereby, it is possible to reduce a noise caused by hitting a road by the edge portions of the block 7 adjacent to the lateral groove 5 and the sub groove 6. In addition, the apertures 5L1, 5L2, 5R1 and 5R2 of both the lateral grooves 5L, 5R, which are opened to the first main groove 2 and the second main groove 3, are shifted from one another in the tire circumferential directions 100. No aperture is aligned with the other apertures in the tire width directions. This enables noise frequencies to be distributed. Thus, the noise performance can be improved. Furthermore, the apertures of the sub grooves 6, which are opened to the second main groove 3, are also shifted in the tire circumferential directions, and thus not aligned with the other apertures. Thereby, the noise frequencies are distributed over a broader range, and the noise performance can be further improved.

On the other hand, the circumferential-direction groove portions LG1b, RG1b of the lateral grooves 5 are extended up to the positions where the groove portions LG1b, RG1b overlap the adjacent sub grooves 6 when seen from the tire side surface. The lengths of the circumferential-direction groove portions LG1b, RG1b are made sufficiently long. Thereby, it is made possible to effectively channel water into the nearby circumferential-direction groove portions LG1b, RG1b, and to discharge the water from the second groove portions LG2, RG2 and the inclined groove portions LG1a, RG1a into the main grooves 2, 3. Thus, even when the rigidity of the block portion 7a is enhanced, the wet performance can be maintained in the same level of the conventional tire without significant deterioration in the drainage.

In the present invention, an inclined angle α of each of the inclined groove portions LG1a, RG1a to the tire circumferential directions 100 should be set within a range from 20° to 80°. Moreover, an inclined angle β of each of the second groove portions LG2, RG2 to the tire circumferential directions 100 should be set within a range from 20° to 80°. If the inclined angles α, β are smaller than the aforementioned ranges, the tire is disadvantageous in term of an uneven wear. In contrast, when the inclined angles exceed the range, it becomes difficult to reduce a noise caused by hitting a road by the edge portions of the blocks 7 adjacent to the lateral grooves 5. Note that, in a case where the second groove portions LG2, RG2 extend in a curved form as illustrated, the inclined angle β is obtained from a straight line that connects both ends of the second groove portion LG2 or RG2 on the center line. An inclined angle of the sub groove 6 to the tire circumferential directions 100 can also be obtained as in the cases of the second groove portions LG2, RG2, and this inclined angle is an angle defined as in the cases of the second groove portions LG2, RG2.

In terms of the uneven wear of the block 7, it is preferable to chamfer: an acute portion of the block 7 sandwiched by the inclined groove portion LG1a or RG1a and the first main groove 2; an acute portion of the block 7 sandwiched by the circumferential-direction groove portion LG1b or RG1b and the second groove portion LG2 or RG2; and an acute portion of the block 7 sandwiched by the second groove portion LG2 or RG2 and the second main groove 3.

A length K, in the tire circumferential direction, of the first groove portion LG1 or RG1 is preferably within a range from 20% to 80% of the length of a tire-contact patch. If the length K in the tire circumferential direction is less than 20% of the length of the tire-contact patch, it becomes difficult to maintain the wet performance. In contrast, when the length K exceeds 80%, the pitch of the lateral grooves 5 is increased, and the noise performance cannot be improved. The length K is more preferably 30% to 70%. Note that the length of the tire-contact patch described herein is measured as follows. Firstly, a pneumatic tire is fitted onto a standard rim described in JATMA (Japan Automobile Tyre Manufacturers Association) YEAR BOOK 2007 and inflated to an inflation pressure of 230 kPa. Then, the tire was loaded under a condition corresponding to 80% load of the maximum load carrying capacity described in JATMA YEAR BOOK 2007. In this condition, the length of the tire-contact patch is measured.

A distance M from the first main groove 2 to the circumferential-direction groove portion LG1b or RG1b is preferably within a range from 10% to 50% of a length N, in the tire width direction, from the first main groove 2 to the second main groove 3. If the distance M is less than 10% of the length N in the tire width direction, the rigidity of the portion 7a of the block 7 defined by the first main groove 2 and the first groove portion LG1 or RG1 is reduced, and an uneven wear is likely to occur in the block portion 7a. In contrast, if the distance M exceeds 50%, the difference in rigidity between the block portion 7a and the block portion 7b is excessively increased; consequently, an uneven wear is likely to occur in the block portion 7b. The distance M is more preferably 20% to 30%.

Figure 3:
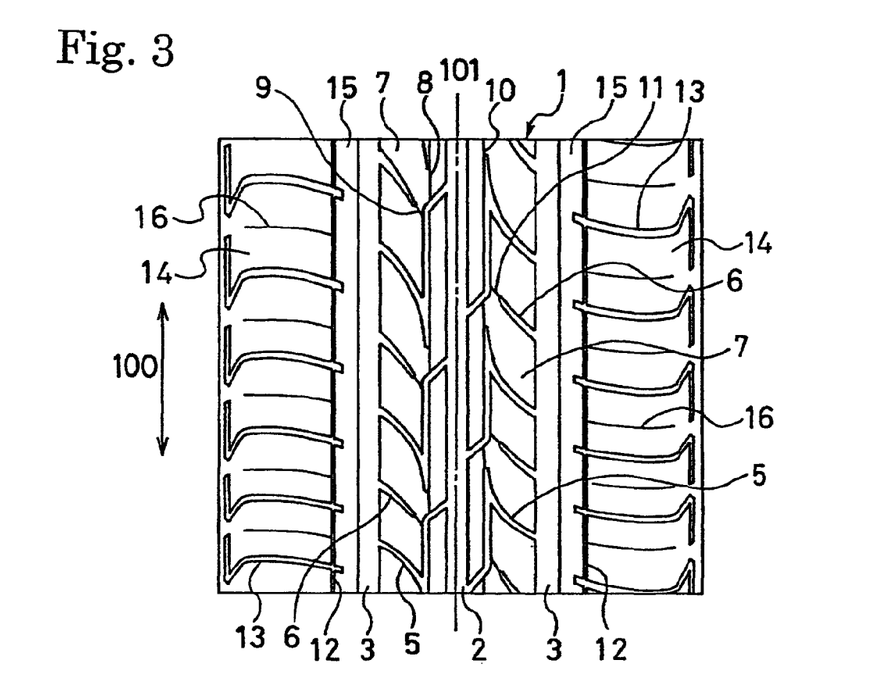
FIG. 3 is a developed view of a principal part of a tread surface for illustrating another embodiment of the pneumatic tire according to the present invention.

In the above embodiment, described is the pneumatic tire provided with the two first main grooves 2. However, in a pneumatic tire according to the present invention, a single first main groove 2 may be provided on a tire equator 101 of a tread surface 1, as shown in FIG. 3.

Figure 4:
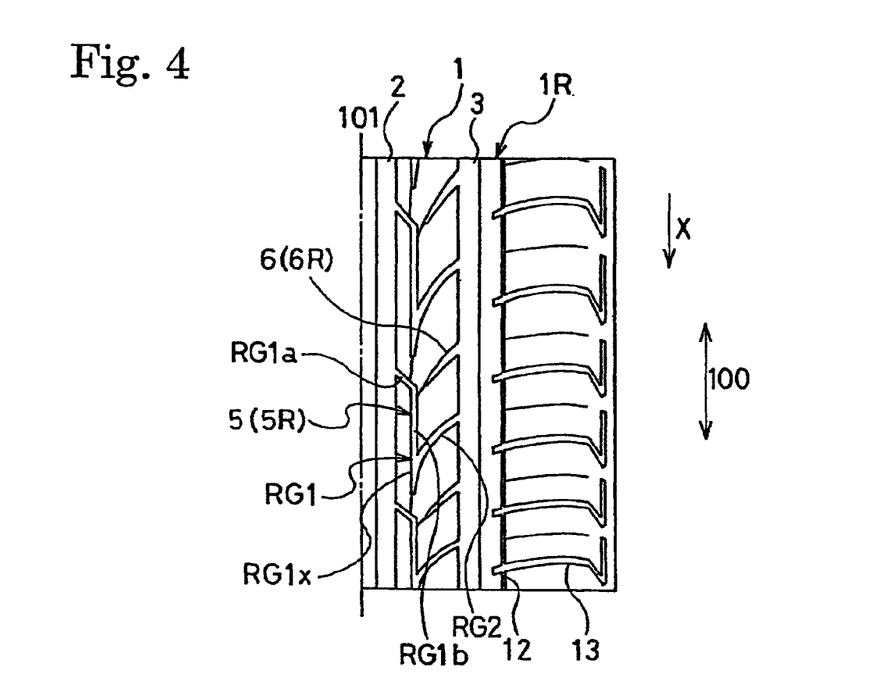
FIG. 4 is a developed view of a part of a tread surface for illustrating still another embodiment of the pneumatic tire according to the present invention.

Instead of the above-described configuration, lateral grooves 5R positioned on the right side of a tread surface region 1R on the right side of a tire equator 101 may be configured as shown in FIG. 4 as similar to left-side lateral grooves 5L. Specifically, the lateral groove 5R is formed of: a first groove portion RG1; and a second groove portion RG2. The first groove portion RG1 extends from a first main groove 2 in one direction of tire circumferential directions 100. The second groove portion RG2 extends from a second main groove 3 inwardly in a tire width direction while curving toward the one direction of the tire circumferential directions 100. The second groove portion RG2 is connected to one side edge portion RG1x of the first groove portion RG1. The first groove portion RG1 is formed of: an inclined groove portion RG1a; and a circumferential-direction groove portion RG1b. The inclined groove portion RG1a extends from the first main groove 2 outwardly in the tire width direction while inclined in the one direction of the tire circumferential directions 100. The circumferential-direction groove portion RG1b extends from the inclined groove portion RG1a in the one direction of the tire circumferential directions 100. Sub grooves 6R on the right side of the tire equator 101 extend from the second main groove 3 inwardly in the tire width direction while curving toward the one direction of the tire circumferential directions 100. The sub grooves 6R are set apart from the first groove portion RG1. The sub grooves 6R are formed in the tire circumferential directions 100 in a manner alternating with the second groove portions RG2. The tread surface 1 may have a directional pattern in which a tire rolling direction is designated in one direction indicated by an arrow X. The pneumatic tire shown in FIG. 3 may also be configured in this manner.

In particular, the present invention can preferably be employed in a pneumatic tire for an automobile. However, the present invention is not limited to this usage.

EXAMPLES

Figure 5:
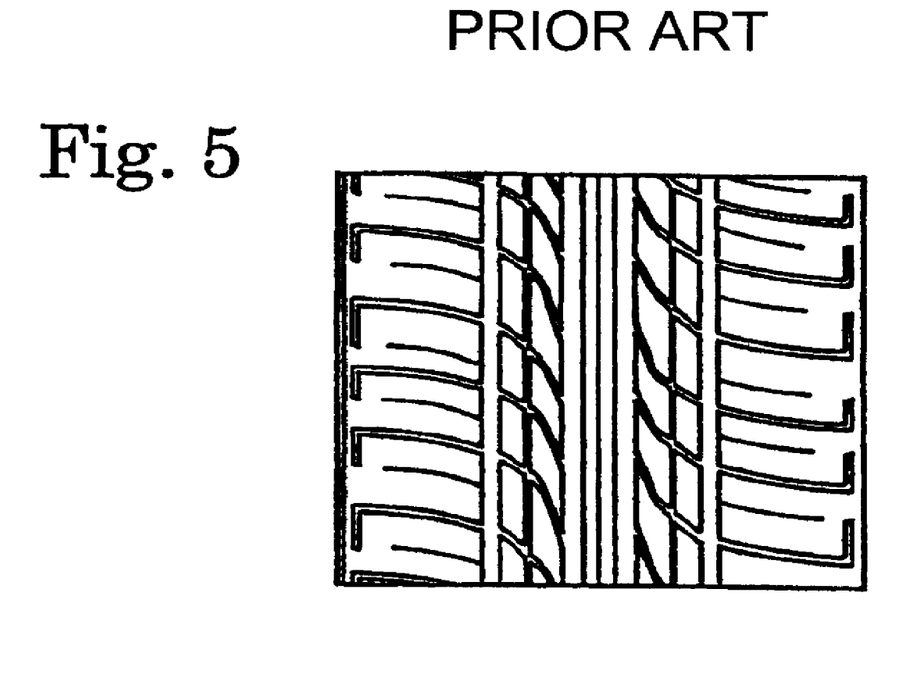
FIG. 5 is a developed view of a principal part of a conventional tire used in Example.

Tires 1 to 4 of the present invention (present Examples 1 to 4) having a tread pattern shown in FIG. 1 and a conventional tire (Conventional Example) having a tread pattern shown in FIG. 5 were prepared as test tires, and both had a tire size of 215/60R16 in common. Each of the tires 1 to 4 of the present invention had, as shown in Table 1: an inclined angle α (°) of an inclined groove portion to a tire circumferential direction; a length K (%), in the tire circumferential direction, of a first groove portion relative to a length of the tire-contact patch; an inclined angle β (°) of a second groove portion to the tire circumferential direction; and a distance M (%) from a first main groove to a circumferential-direction groove portion relative to a length N, in a tire width direction, from the first main groove to a second main groove. All the test tires had substantially the same groove area ratios.

Each of these test tires was fitted onto a rim having a rim size of 16×6.5 JJ and inflated to an inflation pressure of 230 kPa. The test tire was mounted to a vehicle (ABS controlled) with an engine displacement of 2.0 L. Evaluation tests for driving stability, noise performance, and wet performance were performed in the following methods, and the results were obtained as shown in Table 1.

Driving Stability

On a dry test course, a test driver performed a feeling evaluation test on the driving stability. The evaluation result was expressed by indices where the driving stability of the conventional tire was taken as 100. The larger the value, the more excellent the driving stability is.

Noise Performance

On a dry test course, a test driver performed a feeling evaluation on the noise inside the vehicle that runs by inertia from 100 km/hr to 20 km/hr. The evaluation result was expressed by indices where the noise performance of the conventional tire was taken as 100. The larger the value, the more excellent the noise performance is.

Wet Performance

On a wet test course, the vehicle was run at 100 km/hr and applied with a full brake in order to measure a distance until the vehicle stopped. The evaluation result was expressed by indices where the wet performance of the conventional tire was taken as 100. The larger the value, the more excellent the wet performance is.

TABLE 1

|  | Conventional Example | Present Example 1 | Present Example 2 | Present Example 3 | Present Example 4 |
| --- | --- | --- | --- | --- | --- |
| Inclined angle α (°) | — | 30 | 50 | 70 | 40 |
| Length K (%), in tire circumferential direction, of first groove portion | — | 30 | 50 | 70 | 40 |
| Inclined angle β (°) | — | 50 | 30 | 20 | 30 |
| Distance M (%) | — | 20 | 30 | 40 | 25 |
| Driving stability | 100 | 105 | 108 | 106 | 110 |
| Noise performance | 100 | 109 | 107 | 105 | 108 |
| Wet performance | 100 | 99 | 99 | 99 | 99 |

From Table 1, it was found that the tires according to the present invention had a wet performance of 99 or above. It is suggested that the tires according to the present invention is capable of improving the driving stability and noise performance and simultaneously maintaining the same level of the wet performance as in the conventional tire.

What is claimed is:

1. A pneumatic tire comprising:
    single first main grooves extending in tire circumferential directions and disposed respectively on right and left sides of a tire equator of a tread surface wherein the tread surface defines a tire-contact patch; and
    single second main grooves extending in the tire circumferential directions and disposed respectively on outer sides, in tire width directions, of the first main grooves, wherein
    lateral grooves extending between each pair of the first main grooves and the second main grooves as well as sub grooves extending halfway from the second main grooves toward the respective first main grooves are disposed one by one alternately with each other at predetermined pitches in the tire circumferential directions,
    blocks are formed each of which is defined by the first main groove, the second main groove and the lateral grooves, each of the left-side lateral grooves positioned on the left side of the tire equator on the tread surface region includes:
   a first groove portion LG1 extending from the first main groove in one direction of the tire circumferential directions; and
   a second groove portion LG2 extending from the second main groove inwardly in the tire width direction while curving toward the one direction of the tire circumferential directions, and being connected to one side edge portion of the first groove portion LG1,
the first groove portion LG1 has:
   an inclined groove portion LG1a extending from the first main groove outwardly in the tire width direction while inclined toward the one direction of the tire circumferential directions; and
   a circumferential-direction groove portion LG1b extending, in the one direction of the tire circumferential directions, from the inclined groove portion LG1a up to a position where the circumferential-direction groove portion LG1b overlaps the adjacent sub groove when seen from a tire side surface,
the left-side sub grooves extend from the second main groove inwardly in the tire width direction while curving toward the one direction of the tire circumferential directions, and are set apart from the first groove portions LG1,
the left-side sub grooves and the second groove portions LG2 are disposed alternately with each other in the tire circumferential directions,
each of the right-side lateral grooves positioned on the right side of the tire equator on the tread surface region includes:
   a first groove portion RG1 extending from the first main groove in the other direction of the tire circumferential directions; and
   a second groove portion RG2 extending from the second main groove inwardly in the tire width direction while curving toward the other direction of the tire circumferential directions, and being connected to an opposite side edge portion of the first groove portion RG1,
the first groove portion RG1 has:
   an inclined groove portion RG1a extending from the first main groove outwardly in the tire width direction while inclined toward the other direction of the tire circumferential directions; and
   a circumferential-direction groove portion RG1b extending, in the other direction of the tire circumferential directions, from the inclined groove portion RG1a up to a position where the circumferential-direction groove portion RG1b overlaps the adjacent sub groove when seen from a tire side surface,
the right-side sub grooves extend from the second main groove inwardly in the tire width direction while curving toward the other direction of the tire circumferential directions, and are set apart from the first groove portions RG1,
the right-side sub grooves and the second groove portions RG2 are disposed alternately with each other in the tire circumferential directions,
apertures at both ends of each of the lateral grooves are opened to the first main grooves and the second main grooves, respectively, and are shifted from one another in the tire circumferential directions,
the left- and right-side lateral grooves are offset from each other in the tire circumferential directions, and
the apertures of both the left- and right-side lateral grooves are shifted from one another in the tire circumferential directions and wherein each of the left-side sub grooves and the right-side sub grooves remain open in the tire-contact patch and each of the curving groove portions LG2, RG2, inclined groove portions LG1a, RG1a and circumferential direction groove portions LG1b, RG1b remain open in the tire-contact patch.

2. A pneumatic tire comprising:
a single first main groove extending in tire circumferential directions and disposed on a tire equator of a tread surface wherein the tread surface defines a tire-contact patch; and
single second main grooves extending in the tire circumferential directions and disposed respectively on both sides, in tire width directions, of the first main groove, wherein
lateral grooves extending between the first main groove and the respective second main grooves as well as sub grooves extending halfway from the second main grooves toward the first main groove are disposed one by one alternately with each other at predetermined pitches in the tire circumferential directions,
blocks are formed each of which is defined by the first main groove, the second main groove and the lateral grooves,
each of the left-side lateral grooves positioned on the left side of the tire equator on the tread surface region includes:
   a first groove portion LG1 extending from the first main groove in one direction of the tire circumferential directions; and
   a second groove portion LG2 extending from the second main groove inwardly in the tire width direction while curving toward the one direction of the tire circumferential directions, and being connected to one side edge portion of the first groove portion LG1,
the first groove portion LG1 has:
   an inclined groove portion LG1a extending from the first main groove outwardly in the tire width direction while inclined toward the one direction of the tire circumferential directions; and
   a circumferential-direction groove portion LG1b extending, in the one direction of the tire circumferential directions, from the inclined groove portion LG1a up to a position where the circumferential-direction groove portion LG1b overlaps the adjacent sub groove when seen from a tire side surface,
the left-side sub grooves extend from the second main groove inwardly in the tire width direction while curving toward the one direction of the tire circumferential directions, and are set apart from the first groove portions LG1,
the left-side sub grooves and the second groove portions LG2 are disposed alternately with each other in the tire circumferential directions,
each of the right-side lateral grooves positioned on the right side of the tire equator on the tread surface region includes:
   a first groove portion RG1 extending from the first main groove in the other direction of the tire circumferential directions; and
   a second groove portion RG2 extending from the second main groove inwardly in the tire width direction while curving toward the other direction of the tire circumferential directions, and being connected to an opposite side edge portion of the first groove portion RG1,
the first groove portion RG1 has:
an inclined groove portion RG1*a* extending from the first main groove outwardly in the tire width direction while inclined toward the other direction of the tire circumferential directions; and
a circumferential-direction groove portion RG1*b* extending, in the other direction of the tire circumferential directions, from the inclined groove portion RG1*a* up to a position where the circumferential-direction groove portion RG1*b* overlaps the adjacent sub groove when seen from a tire side surface,
the right-side sub grooves extend from the second main groove inwardly in the tire width direction while curving toward the other direction of the tire circumferential directions, and are set apart from the first groove portions RG1,
the right-side sub grooves and the second groove portions RG2 are disposed alternately with each other in the tire circumferential directions,
apertures at both ends of each of the lateral grooves are opened to the first main groove and the second main grooves, respectively, and are shifted from one another in the tire circumferential directions,
the left- and right-side lateral grooves are offset from each other in the tire circumferential directions, and
the apertures of both the left- and right-side lateral grooves are shifted from one another in the tire circumferential directions and wherein each of the left-side sub grooves and the right-side sub grooves remain open in the tire-contact patch and each of the curving groove portions LG2, RG2, inclined groove portions LG1*a*, RG1*a* and circumferential direction groove portions LG1*b*, RG1*b* remain open in the tire-contact patch.

3. The pneumatic tire according to any one of claims 1 and 2, wherein an aperture of the sub groove is opened to the second main groove, and is shifted from both the apertures of the lateral groove in the tire circumferential directions.

4. The pneumatic tire according to any one of claims 1 and 2, wherein an inclined angle $\alpha$ of each of the inclined groove portions LG1*a*, RG1*a* to the tire circumferential directions is 20° to 80°.

5. The pneumatic tire according to any one of claims 1 and 2, wherein a length, in the tire circumferential direction, of each of the first groove portions LG1, RG1 is 20% to 80% of a length of a tire-contact patch.

6. The pneumatic tire according to any one of claims 1 and 2, wherein an inclined angle $\beta$ of each of the second groove portions LG2, RG2 to the tire circumferential directions is 20° to 80°.

7. The pneumatic tire according to any one of claims 1 and 2, wherein a distance from the first main groove to each of the circumferential-direction groove portions LG1*b*, RG1*b* is 10% to 50% of a length, in the tire width direction, from the first main groove to the second main groove.

8. The pneumatic tire according to any one of claims 1 and 2, wherein
in a shoulder region, outer than each second main groove in the tire width direction, in the tread surface,
a single circumferential-direction narrow groove extending in the tire circumferential directions is formed closer to and on the outer side, in the tire width directions, of each second main groove, lateral grooves extending in the tire width directions are disposed at predetermined pitches in the tire circumferential directions, and
the lateral grooves extend, outwardly in the tire width direction, from positions apart from the second main groove across the circumferential-direction narrow groove and beyond the corresponding edge of the tire-contact patch.

9. A pneumatic tire comprising:
single first main grooves extending in tire circumferential directions and disposed respectively on right and left sides of a tire equator of a tread surface wherein the tread surface defines a tire-contact patch; and
single second main grooves extending in the tire circumferential directions and disposed respectively on outer sides, in tire width directions, of the first main grooves, wherein
lateral grooves extending between each pair of the first main grooves and the second main grooves as well as sub grooves extending halfway from the second main grooves toward the respective first main grooves are disposed one by one alternately with each other at predetermined pitches in the tire circumferential directions,
blocks are formed each of which is defined by the first main groove, the second main groove and the lateral grooves,
each of the left-side lateral grooves positioned on the left side of the tire equator on the tread surface region includes:
a first groove portion LG1 extending from the first main groove in one direction of the tire circumferential directions; and
a second groove portion LG2 extending from the second main groove inwardly in the tire width direction while curving toward the one direction of the tire circumferential directions, and being connected to one side edge portion of the first groove portion LG1,
the first groove portion LG1 has:
an inclined groove portion LG1*a* extending from the first main groove outwardly in the tire width direction while inclined toward the one direction of the tire circumferential directions; and
a circumferential-direction groove portion LG1*b* extending, in the one direction of the tire circumferential directions, from the inclined groove portion LG1*a* up to a position where the circumferential-direction groove portion LG1*b* overlaps the adjacent sub groove when seen from a tire side surface,
the left-side sub grooves extend from the second main groove inwardly in the tire width direction while curving toward the one direction of the tire circumferential directions, and are set apart from the first groove portions LG1,
the left-side sub grooves and the second groove portions LG2 are disposed alternately with each other in the tire circumferential directions,
each of the right-side lateral grooves positioned on the right side of the tire equator on the tread surface region includes:
a first groove portion RG1 extending from the first main groove in the one direction of the tire circumferential directions; and
a second groove portion RG2 extending from the second main groove inwardly in the tire width direction while curving toward the one direction of the tire circumferential directions, and being connected to one side edge portion of the first groove portion RG1, the first groove portion RG1 has:
- an inclined groove portion RG1*a* extending from the first main groove outwardly in the tire width direction while inclined toward the one direction of the tire circumferential directions; and
- a circumferential-direction groove portion RG1*b* extending, in the one direction of the tire circumferential directions, from the inclined groove portion RG1*a* up to a position where the circumferential-direction groove portion overlaps the adjacent sub groove when seen from the tire side surface, the right-side sub grooves extend from the second main groove inwardly in the tire width direction while curving toward the one direction of the tire circumferential directions, and are set apart from the first groove portions RG1, the right-side sub grooves and the second groove portions RG2 are disposed alternately with each other in the tire circumferential directions, and apertures at both ends of each of the lateral grooves are opened to the first main grooves and the second main grooves, respectively, and are shifted from one another in the tire circumferential directions, the left- and right-side lateral grooves are offset from each other in the tire circumferential directions, the apertures of both the left- and right-side lateral grooves are shifted from one another in the tire circumferential directions, and the tread surface is provided with a directional pattern designating a tire rolling direction and wherein each of the left-side sub grooves and the right-side sub grooves remain open in the tire-contact patch and each of the curving groove portions LG2, RG2, inclined groove portions LG1*a*, RG1*a* and circumferential direction groove portions LG1*b*, RG1*b* remain open in the tire-contact patch.

10. A pneumatic tire comprising:

single first main grooves extending in tire circumferential directions and disposed respectively on right and left sides of a tire equator of a tread surface wherein the tread surface defines a tire-contact patch; and single second main grooves extending in the tire circumferential directions and disposed respectively on outer sides, in tire width directions, of the first main grooves, wherein lateral grooves extending between each pair of the first main grooves and the second main grooves as well as sub grooves extending halfway from the second main grooves toward the respective first main grooves are disposed one by one alternately with each other at predetermined pitches in the tire circumferential directions, blocks are formed each of which is defined by the first main groove, the second main groove and the lateral grooves, each of the left-side lateral grooves positioned on the left side of the tire equator on the tread surface region includes:
- a first groove portion LG1 extending from the first main groove in one direction of the tire circumferential directions; and
- a second groove portion LG2 extending from the second main groove inwardly in the tire width direction while curving toward the one direction of the tire circumferential directions, and being connected to one side edge portion of the first groove portion LG1, the first groove portion LG1 has:
- an inclined groove portion LG1*a* extending from the first main groove outwardly in the tire width direction while inclined toward the one direction of the tire circumferential directions; and
- a circumferential-direction groove portion LG1*b* extending, in the one direction of the tire circumferential directions, from the inclined groove portion LG1*a* up to a position where the circumferential-direction groove portion LG1*b* overlaps the adjacent sub groove when seen from a tire side surface, the left-side sub grooves extend from the second main groove inwardly in the tire width direction while curving toward the one direction of the tire circumferential directions, and are set apart from the first groove portions LG1, the left-side sub grooves and the second groove portions LG2 are disposed alternately with each other in the tire circumferential directions, apertures at both ends of each of the lateral grooves are opened to the first main grooves and the second main grooves, respectively, and are shifted from one another in the tire circumferential directions, the left- and right-side lateral grooves are offset from each other in the tire circumferential directions, and the apertures of both the left- and right-side lateral grooves are shifted from one another in the tire circumferential directions, each of the right-side lateral grooves positioned on the right side of the tire equator on the tread surface region includes:
- a first groove portion RG1 extending from the first main groove in the one direction of the tire circumferential directions; and
- a second groove portion RG2 extending from the second main groove inwardly in the tire width direction while curving toward the one direction of the tire circumferential directions, and being connected to one side edge portion of the first groove portion RG1, the first groove portion RG1 has:
- an inclined groove portion RG1*a* extending from the first main groove outwardly in the tire width direction while inclined toward the one direction of the tire circumferential directions; and
- a circumferential-direction groove portion RG1*b* extending, in the one direction of the tire circumferential directions, from the inclined groove portion RG1*a* up to a position where the circumferential-direction groove portion overlaps the adjacent sub groove when seen from the tire side surface, the right-side sub grooves extend from the second main groove inwardly in the tire width direction while curving toward the one direction of the tire circumferential directions, and are set apart from the first groove portions RG1, the right-side sub grooves and the second groove portions RG2 are disposed alternately with each other in the tire circumferential directions, and the tread surface is provided with a directional pattern designating a tire rolling direction and wherein each of the left-side sub grooves and the right-side sub grooves remain open in the tire-contact patch and each of the curving groove portions LG2, RG2, inclined groove portions LG1*a*, RG1*a* and circumferential direction groove portions LG1*b*, RG1*b* remain open in the tire-contact patch.

* * * * *